April 15, 1930. W. W. ROWE 1,755,133
COVER FOR ANNULAR OBJECTS
Filed March 28, 1928   2 Sheets-Sheet 1

INVENTOR.
William Wallace Rowe
BY Allen + Allen
ATTORNEY.

April 15, 1930.  W. W. ROWE  1,755,133
COVER FOR ANNULAR OBJECTS
Filed March 28, 1928  2 Sheets-Sheet 2
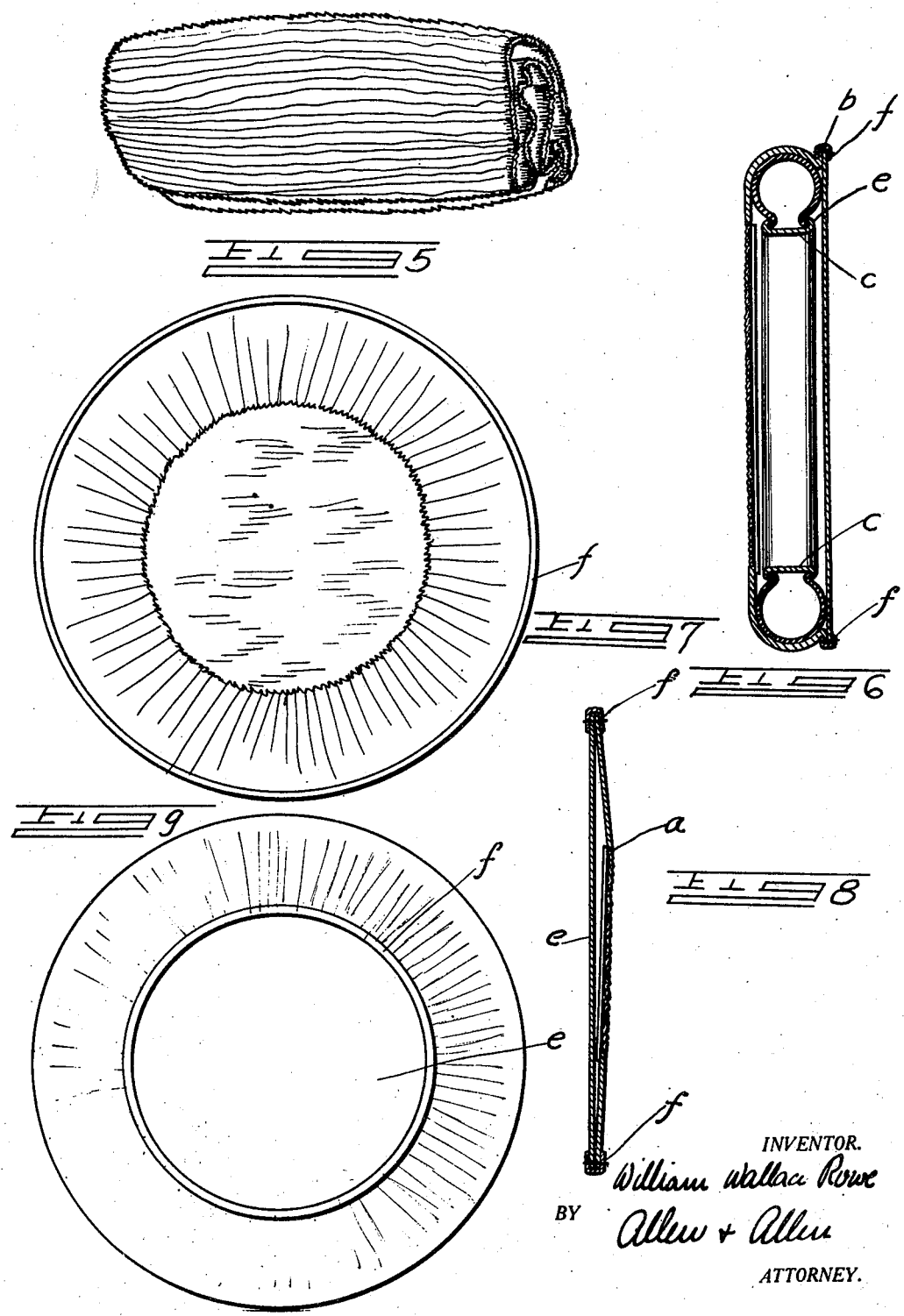
INVENTOR.
William Wallace Rowe
BY Allen + Allen
ATTORNEY.

Patented Apr. 15, 1930

1,755,133

UNITED STATES PATENT OFFICE

WILLIAM WALLACE ROWE, OF CINCINNATI, OHIO, ASSIGNOR TO THE PAPER SERVICE COMPANY, OF LOCKLAND, OHIO, A CORPORATION OF OHIO

COVER FOR ANNULAR OBJECTS

Application filed March 28, 1928. Serial No. 265,445.

It is a general object of my invention to provide coverings for annular objects. Heretofore annular objects such as coils of wire, rubber and metal hose and the like have been wrapped by winding narrow strips of material around the annular coil in a plurality of helical turns, necessitating expensive machinery and the folding, locking or pasting of the strips at the overlapping point. I provide a covering or wrapping which requires no such manipulation and which is cheap and easily installed.

It is a specific object of my invention to provide tire covers. Heretofore tire covers, for use upon the spare tires of motor vehicles, have in general been made of comparatively expensive fabrics, such as those resembling oil cloth, keratol, or the leather substitutes. They have been made to conform to the configuration of the tire—which is essential for appearance's sake—by sewing them together from shaped sections, involving labor and considerable wastage of material. Further, such tire covers must be stocked by the distributor in separate sizes; they are inconvenient to apply, and initially expensive; and they frequently wear out in a length of time out of all proportion to the service expected of so expensive an article. All of these factors, but especially the first cost, restrict the use of tire covers, as is evidenced by the number of unprotected spare tires seen on moderate priced vehicles, and this notwithstanding it is generally known that rubber deteriorates rapidly when unprotected from the action of the elements.

There is a wide and ready market for a neat and sufficient, but cheap tire cover, not only for the protection of spares but for the shipment of new goods. It is an object of my invention to produce such an article.

It is an object of my invention to do away with the necessity of fabricating tire covers from a number of shaped cut-outs. I use preferably a single strip of material which is stretchable so as to conform to the shape of the tire; and I provide means to keep the side edges thereof snugly contracted.

It is an object of my invention to provide a tire cover which is readily slipped on and off, which does not require fitting in the manufacture, and which is adaptable to a variety of tire sizes.

It is an object of my invention to provide a tire cover of inexpensive material such as creped and waterproofed paper which can be sold at a low figure.

These and other objects of my invention will be apparent to one skilled in the art upon reading these specifications.

In the drawings:

Figure 5 shows one of my tire covers rolled for storage or shipment.

Figure 6 shows in section an alternative form of tire cover with a solid face, in place upon a tire.

Figure 7 shows the cover folded flat for storage or shipment.

Figure 8 is a sectional view thereof.

Figure 9 shows in elevation the alternative form of cover in place upon a tire.

While there are many suitable fabrics for my cover,—many woven materials when cut on the bias having sufficient stretchability— yet I prefer to use a creped paper. This may comprise two layers of paper cemented together with an adhesive, preferably waterproof, or a single layer of paper preferably waterproof. The paper may be creped with the use of a heat plastic substance as the adhesive in the creping process, as described in my Patent #1,628,515, of May 10, 1927, or by any other suitable creping process. These products are fabrics substantially nonstretchable longitudinally of the corrugations, but having ample stretchability transversely thereof to allow my cover to conform snugly to the tire. These materials are very inexpensive, may be waterproof, and enable me to produce one article which is equally adapted to the protection of a tire in shipment and upon an automobile, or of any other annular object.

I will now describe one form of tire cover embodying my invention, it being understood that my invention is applicable to many other forms as will hereinafter be explained.

Figure 1:
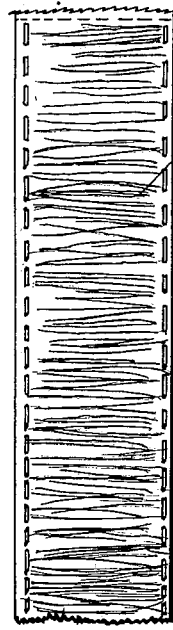
Figure 1 shows the single strip of material, stretchable longitudinally, from which my tire cover is made.

I take of creped material a strip such as is illustrated in Figure 1, preferably less in length than the outside circumference of the tire; but of a width such that, bent around the tire section, will give the coverage desired.

Figure 2:
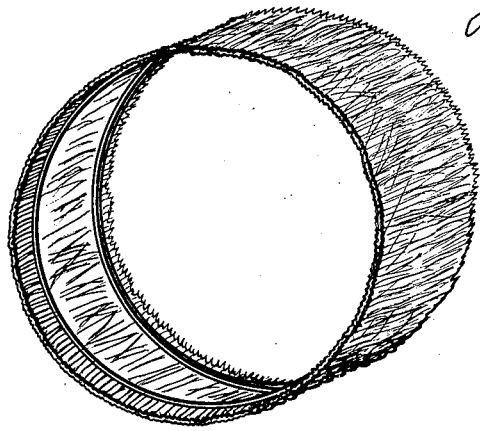
Figure 2 shows an end view of the cover unrolled and ready for installation, but before it has been placed on a tire.

Either before or after joining the ends of this strip to form the cylindrical article shown in Figure 2, I prefer to attach a binding to the edges of the strip. If my cover is to be used only in protecting a tire during shipment, in conjunction with some external wrappings or bindings which will hold it in place and conform it to the tire surface, then edge binding may be omitted; but where my tire cover is to be used upon spare tires attached to automobiles, a binding upon the edge is advisable. The form of such binding may vary. It may be the ordinary sewed tape binding. Clearly, the binding, of whatever kind, will be applied to the fabric so as to hold the edges thereof unexpanded; and it will be further obvious that if an inelastic binding is used it must be severed upon one or both sides and provided with a fastening, or the strip must not be sewn together so as to be endless, to permit placing the cover upon the tire, since the inelastic binding will be less in circumference than the outside of the tire. Again I may, if desired, use a drawstring or elastic or spring in a sleeve-like construction of the edge of the strip instead of a binding.

Figure 3:
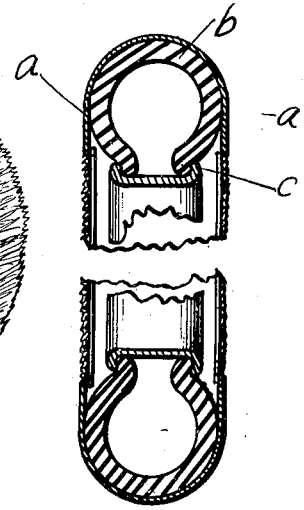
Figure 3 is a sectional view of the cover in place.

I prefer to use as binding, however, an elastic stitching which is fully described in a co-pending application in the name of William C. Kemp, Serial No. 250,045 filed January 27, 1928. In this stitching an elastic filament holds the fabric normally in an unexpanded (or even contracted) condition; but the stitching is such that the fabric can be greatly stretched without a parting either of the elastic filament or the inelastic threads forming the said stitching. In this way I can construct a tire cover in which neither the binding nor the strip of material need be severed or provided with fasteners. In Figures 1, 2, and 3 I have indicated this stitching at $a$, and in Figure 3 I have shown how it causes my cover to conform to the shape of a tire $b$ mounted upon the rim $c$.

Figure 4:
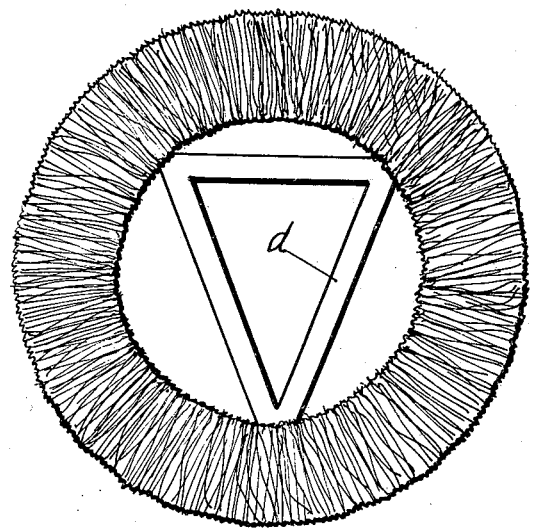
Figure 4 is an elevation thereof.

In Figure 4 I have shown an elevation of my cover in place. In this view the cover has been made of such width as to protect the whole tire and rim, leaving visible only the metallic parts $d$ of the rim carrier.

My tire cover can be rolled for storage or shipment into the compact bundle I have shown in Figure 5.

Instead of a binding upon one side of my cover, I may prefer to sew or otherwise fasten one side to a circular piece $e$, (Figures 6, 8 and 9,) which may conveniently be of the same fabric as the cover, or of a heavier material. It may be stretchable or non-stretchable. I prefer to bind the juncture of my cover proper with this circular piece with strips of material or tape $f$, though these may be omitted where desired. An over-edge stitching is applicable here. The circular piece gives somewhat more protection to the tire, and also provides a larger space for a name or advertising display. Further, it gives an article which folds flat for storage or shipment. Reference to the elevation in Figure 7 and the section in Figure 8 will indicate how the elastic stitching, by contracting the edge of the cover proper which is not attached to the circular piece, causes the cover to assume an annular form and to lie against the circular piece leaving the article quite flat for storage or shipment.

The provision of fastenings where required, and of drainage openings, together with various modifications of the particular constructions described and shown by me, will lie within the ability of those skilled in the art to produce, without departing from the spirit of my invention.

As a further modification of my invention, I may make a disk of creped paper considerably larger in circumference than the circumference of the tire, and I may form about the edges thereof a sleeve through which to run a drawstring or an elastic member, or I may run about the edge thereof, the aforementioned elastic stitching under such tension as will tend very considerably to contract said edge. In this way I may make a one piece tire cover adapted to lie not only about the periphery of the tire but also to cover one entire open space thereof just as is done by the disk $f$ in Figure 6. In this construction of my tire cover, the stretchability of the edges will, of course, vary, and those portions of the edge in which the line of the creping runs perpendicular or nearly so to the said edge, will have a lateral stretchability; but the places where the line of creping runs parallel to the edge, will have a transverse stretchability; and since a lateral stretchability is preferable, instead of making my tire cover out of a single piece of material, I may prefer to make it out of 2, 3, 4 or more pieces sewed together so that all about the edge the line of the creping will be substantially perpendicular to the edge.

Again in that style of tire cover in which I provide a circular disk attached to the cylindrical portion, it will be understood that I may make one or more apertures in this disk so that a license plate or tail light may be seen therethrough. Or instead of using an entire disk, I may attach a portion of a disc to the cylindrical strip. I may in this way provide a tire cover with but half a disk or a portion of a disk cut to special shapes, or even a strip across in lieu of a disk. These various modifications and others may be made by one skilled in the art without departing from the spirit of my invention. Wherever in the following claims I have used the word "binding" I desire to be understood as contemplating an elastic stitching, a sleeve and drawstring, or any means for contracting the edges or holding them against expansion. Also, where I have used the word cylinder I contemplate a cover for annular objects which is of general cylindrical shape as distinguished from a wrapping passing completely around the annullus; but such cylinder may be closed or unclosed or overlapping circumferentially.

Having thus described my invention, what I claim as new and desire to secure by Letters Patent, is:—

1. A tire cover adapted for use on a variety of different sizes of tires, comprising a disc, and a strip of stretchable paper of sufficient stretchability to pass over and conform to the surface of a tire substantially larger in diameter than said disc, said strip adapted to form a cylinder joined upon one edge to said disc, and having elastic edge constricting means on the other edge.

2. A detachable spare tire cover comprising a disc of relatively stiff material adapted to receive an advertising device, a longitudinally corrugated tube of creped paper having one edge secured to said disc and resilient means normally restricting the corrugations of the other edge in unexpanded condition.

3. A detachable spare tire cover comprising a disc of relatively stiff material adapted to receive an advertising device, a longitudinally corrugated tube of creped paper having one edge secured to said disc and resilient means normally restricting the corrugations of the other edge in unexpanded condition, whereby said tube is held in surface engagement with the inner face of said disc.

4. A detachable spare tire cover comprising a disc of relatively stiff material adapted to receive an advertising device, a longitudinally corrugated tube of creped paper having one edge secured to said disc and resilient means normally restricting the corrugations of the other edge in unexpanded condition, said resilient means expansible to permit the application of said cover to tires of different diameters.

5. As a new article of manufacture a quickly mountable and removable advertising cover for spare tires comprising a flat disc, a flat ring of circumferentially yieldable paper secured at its outer circumference to the circumference of the disc whereby the ring is rendered non-yieldable at its outer circumference, and edge constricting means at the inner circumference of the ring, the edge constricting means, when the device is in an operative position on a tire, causing the ring to flex arcuately in a transverse direction and to yield circumferentially intermediate its inner and outer circumferences.

WILLIAM WALLACE ROWE.